United States Patent
Jayaraman et al.

(10) Patent No.: US 11,617,123 B2
(45) Date of Patent: Mar. 28, 2023

(54) RU (RESOURCE UNIT)—BASED MEDIUM ACCESS CONTROL FOR SUPPRESSING AIRTIME OF QUARANTINED STATIONS ON WI-FI COMMUNICATION NETWORKS

(71) Applicant: Fortinet, Inc., Sunnyvale, CA (US)

(72) Inventors: Mohan Jayaraman, Bangalore (IN); P C Sridhar, Bangalore (IN); Pradeep Mohan, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/117,012

(22) Filed: Dec. 9, 2020

(65) Prior Publication Data

US 2022/0182919 A1    Jun. 9, 2022

(51) Int. Cl.
| | |
|---|---|
| *H04W 48/02* | (2009.01) |
| *H04W 28/16* | (2009.01) |
| *H04L 12/46* | (2006.01) |
| *H04W 48/08* | (2009.01) |
| *H04W 28/02* | (2009.01) |
| *H04W 88/12* | (2009.01) |
| *H04W 84/12* | (2009.01) |

(52) U.S. Cl.
CPC ......... *H04W 48/02* (2013.01); *H04L 12/4641* (2013.01); *H04W 28/0247* (2013.01); *H04W 28/16* (2013.01); *H04W 48/08* (2013.01); *H04W 84/12* (2013.01); *H04W 88/12* (2013.01)

(58) Field of Classification Search
CPC ..... H04W 48/02; H04W 48/08; H04W 48/12; H04W 88/12; H04W 28/0247; H04W 28/16; H04L 12/4641
See application file for complete search history.

(56) References Cited

U.S. PATENT DOCUMENTS

| | | | |
|---|---|---|---|
| 10,348,767 B1* | 7/2019 | Lee | H04L 63/1416 |
| 11,051,172 B2* | 6/2021 | Avula | H04W 76/14 |
| 2016/0112286 A1* | 4/2016 | Theogaraj | H04L 12/4641 709/224 |
| 2017/0289814 A1* | 10/2017 | Kaushik | H04W 12/12 |
| 2017/0302553 A1* | 10/2017 | Zafer | H04W 28/0236 |
| 2018/0152447 A1* | 5/2018 | Brockhaus | H04L 63/0823 |
| 2018/0359269 A1* | 12/2018 | Caceres | H04L 63/1425 |
| 2019/0021004 A1* | 1/2019 | Shanmugavadivel | H04W 12/08 |
| 2019/0028892 A1* | 1/2019 | Henry | H04L 9/3271 |

(Continued)

FOREIGN PATENT DOCUMENTS

| | | | | |
|---|---|---|---|---|
| WO | WO-2011041058 A2 * | 4/2011 | | H04L 63/0815 |
| WO | WO-2014008427 A1 * | 1/2014 | | H04W 76/022 |

*Primary Examiner* — Chi H Pham
*Assistant Examiner* — Vladislav Y Agureyev
(74) *Attorney, Agent, or Firm* — Law Office Of Dorian Cartwright; Dorian Cartwright

(57) ABSTRACT

Airtime network policies for quarantined station network policies are stored in a database for application to quarantined stations. Quarantined stations are moved from a first VLAN to a quarantine VLAN with a dedicated BSSID on the Wi-Fi communication network. An RU airtime allocation module of the access point allocates airtime RUs for suppression of some or all transmissions from the quarantined stations. The airtime RU allocation module determines an amount of RUs for access to airtime on a Wi-Fi communications network, based on a network policy that limits an amount of airtime allowed by quarantined stations.

9 Claims, 6 Drawing Sheets

(56) References Cited

U.S. PATENT DOCUMENTS

| | | | |
|---|---|---|---|
| 2019/0159245 A1* | 5/2019 | Park | H04W 74/008 |
| 2019/0190952 A1* | 6/2019 | Cherry | H04L 63/1491 |
| 2019/0261222 A1* | 8/2019 | Raleigh | H04W 28/02 |
| 2020/0092251 A1* | 3/2020 | Peterson | H04L 41/142 |
| 2021/0076216 A1* | 3/2021 | Hotchkiss | H04W 12/082 |
| 2021/0099473 A1* | 4/2021 | Fainberg | H04L 63/1416 |
| 2021/0105773 A1* | 4/2021 | McFarland | H04L 5/0007 |
| 2021/0119815 A1* | 4/2021 | Liu | H04L 12/66 |
| 2021/0204105 A1* | 7/2021 | McFarthing | H04W 4/70 |
| 2021/0282020 A1* | 9/2021 | Barton | H04W 16/10 |
| 2021/0320831 A1* | 10/2021 | Park | H04W 72/0453 |
| 2021/0336827 A1* | 10/2021 | Park | H04L 27/2621 |
| 2021/0360646 A1* | 11/2021 | Chu | H04W 52/0229 |
| 2021/0385830 A1* | 12/2021 | Lim | H04W 72/0453 |
| 2021/0409172 A1* | 12/2021 | Chen | H04L 5/0041 |
| 2022/0007362 A1* | 1/2022 | Lim | H04L 27/2613 |

* cited by examiner

RU (RESOURCE UNIT)—BASED MEDIUM ACCESS CONTROL FOR SUPPRESSING AIRTIME OF QUARANTINED STATIONS ON WI-FI COMMUNICATION NETWORKS

FIELD OF THE INVENTION

The invention relates generally to computer networking, and more specifically, RU (resource unit)-based medium access control for suppressing airtime of quarantined stations on Wi-Fi communication networks.

BACKGROUND

The IEEE 802.11ax standard is high efficiency wireless which includes both downlink and uplink multi-user operation by means of MU-MIMO and orthogonal frequency domain multiple access OFDMA technologies. This allows multiple devices to be served simultaneously in order to improve overall capacity, latency and efficiency in dense signal environments.

Network access control is a network security solution that controls access to the network using a set of protocols by enforcing a network policy on the devices, when they initially attempt to access the network. As an example, when a computer initially connects to a network, it is not allowed to access anything until it complies with the enforced policy. Quarantine VLANs are restricted IP networks that the devices are moved to, if they are not found to be compliant of the network security policies.

Problematically, stations rather than networks control airtime usage for uplinks to access points. The network security policies are thus applied at the edge, access points, after transmission by stations. As a consequence, quarantined stations can continue to flood access points at their own leisure. This additional network congestion reduces network performance, as network resources are tied up processing quarantine data packets sent by quarantined stations.

What is needed is a robust technique for an extended RU-based medium access control for suppressing airtime of quarantined stations on Wi-Fi communication networks, prior to transmission from the quarantined stations.

SUMMARY

To meet the above-described needs, methods, computer program products, and systems for extended RU-based medium access control for suppressing airtime of quarantined stations on Wi-Fi communication networks, prior to transmission from the quarantined stations. Access points extend network-side control of the network to airtime control by suppressing transmissions of quarantined stations, in an embodiment.

In one embodiment, airtime network policies for quarantined station network policies are stored in a database for application to quarantined stations. Quarantined stations are moved from a first VLAN to a quarantine VLAN. The VLAN has a dedicated BSSID on the Wi-Fi communication network. The quarantining module also moves stations taken off quarantine back to the first VLAN.

In another embodiment, an RU airtime allocation module of the access point allocates airtime RUs to each of the quarantined stations. The airtime RUs allocated through trigger data packets are transmitted from the access point to the quarantined stations. The airtime RU allocation module determines an amount of RUs for access to airtime on a Wi-Fi communications network, based on a network policy that limits an amount of airtime allowed by quarantined stations. Total spectral bandwidth of the quarantined VLAN amounts to at least one of: 20 MHz, 40 MHz, 80 MHz and 160 MHz.

Advantageously, network performance is improved due to a more efficient use of access point resources. Another benefit is that network congestion is reduced by preventing transmissions. Additionally, computer performance is improved due to efficient use of access point resources.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for accelerating TCP classification sessions for cache misses in a network processor. Access points extend network-side control of the network to airtime control by suppressing transmissions of quarantined stations, in an embodiment.

Figure 1:
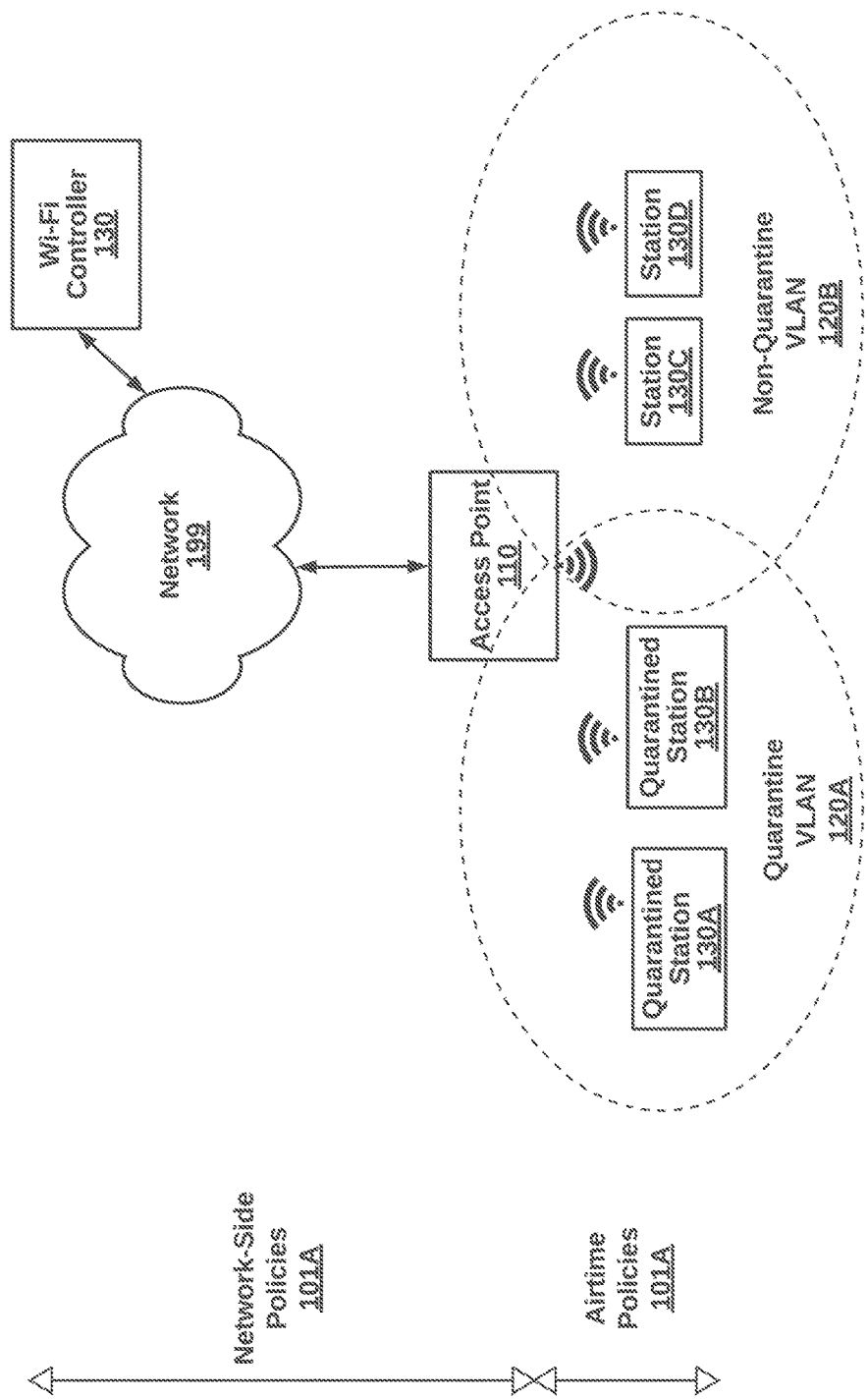
FIG. 1 is a high-level block diagram illustrating a system for RU-based medium access control for suppressing airtime of quarantined stations on Wi-Fi communication networks, prior to transmission from the quarantined stations, according to one embodiment.
Figure 2B:
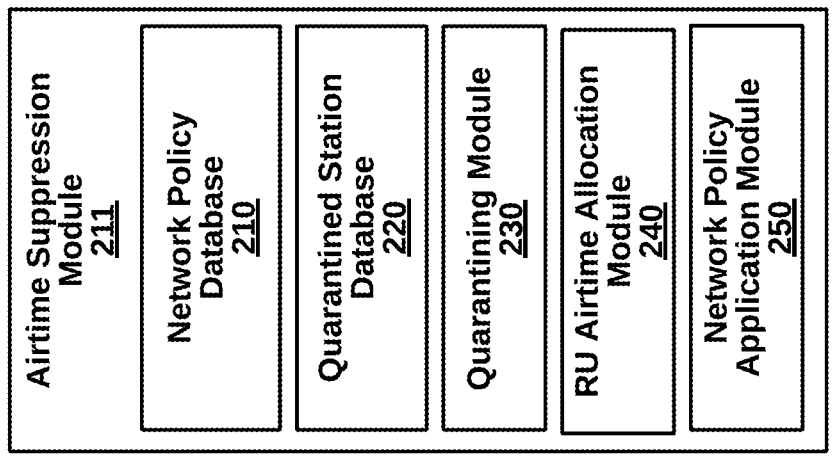
FIG. 2B is a more detailed block diagram illustrating an example airtime suppression module of the access point of FIG. 2A, according to an embodiment.
Figure 2A:
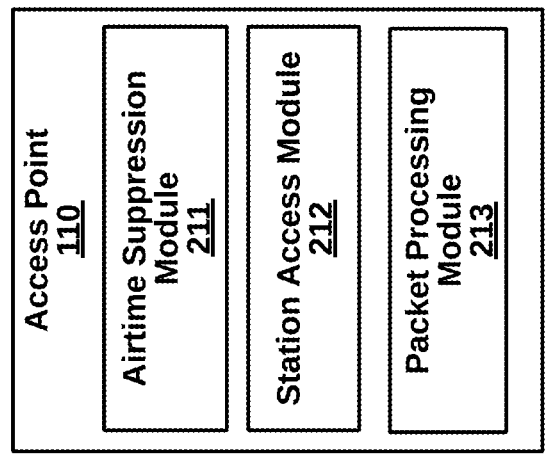
FIG. 2A is a more detailed block diagram illustrating an example access point of the system of FIG. 1, according to one embodiment.
Figure 3:
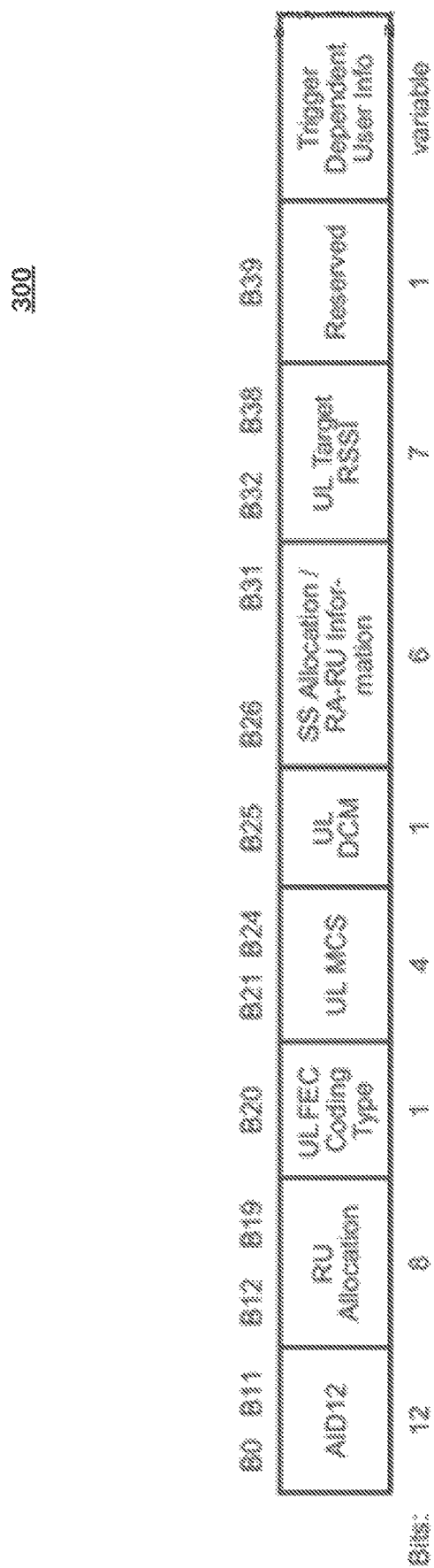
FIG. 3 is a block diagram illustrating a trigger frame for assigning RUs to quarantined stations, according to an embodiment.

Systems for RU-Based Suppression of Quarantined Station Airtime (FIGS. 1-3)

FIG. 1 is a high-level block diagram illustrating a system 100 for RU-based medium access control for suppressing airtime of quarantined stations on Wi-Fi communication networks, prior to transmission from the quarantined stations, according to one embodiment. The system 100 includes an access point 110 and quarantined stations 120B organized under a quarantined VLAN 115B, and other non-quarantined stations 120A organized under a first VLAN 120A. In an embodiment, the access point 110 is one of a plurality of access points under management of a Wi-Fi controller 130. Many other embodiments of the system 100 besides the present use case are possible. Component can be electrically coupled or otherwise coupled in data communication. Moreover, the access point 110 typically includes additional functionality depending on its role within the network architecture. For example, a firewall performs deep packet inspection for identifying malicious packets. In another example, an access point manages Wi-Fi stations and communicates with other access points and can be managed by Wi-Fi controllers.

The access point 110 (e.g., FORTIAP) extends network-side control of the network across the air channel by suppressing transmissions by quarantined stations, in an embodiment. The access point 110 can be any network device, such as a gateway, a router, a switch, a firewall, a Wi-Fi controller, or any other device that processes network traffic.

More generally, the network-side control refers to wired backend network controls on a first network input/output of an access point. Airtime control refers to wireless Wi-Fi network controls on a second network input/output of the access point. The airtime has traditionally been considered beyond control of networks because it is traditionally beyond control of access points. The IEEE 802.11 protocol places airtime control with wireless stations. However, the access point 110 utilizes RU allocation to provide the missing network control over airtime.

In one embodiment, network policies for quarantined station network policies are stored in a database. The quarantined station database 220 stores a list of quarantined stations. Quarantined stations are moved from a first VLAN to a quarantine VLAN. The VLAN has a dedicated BSSID on the Wi-Fi communication network. The quarantining module 230 also moves stations taken off quarantine back to the first VLAN.

The RU airtime allocation module 240 allocates airtime RUs for suppression of the quarantined stations. To do so, the airtime RUs allocated through trigger frames generated and transmitted from the access point to the quarantined stations. The airtime RU allocation module determines an amount of RUs for access to airtime on a Wi-Fi communications network, based on a network policy that limits an amount of airtime allowed by quarantined stations.

Total spectral bandwidth of the quarantined VLAN amounts to at least one of: 20 MHz, 40 MHz, 80 MHz and 160 MHz. In OFDMA, a channel is subdivided into smaller channels, or resource units. This is so there can be simultaneous transmissions to different devices. These subcarriers (tones), the smaller channels of the main channel, are called resource units. An AP can allocate varying resource units for multi-user communications. For example, a 20 MHz channel has 242 resource units which can be further split into 2×106 resource units, 4×52 resource units, or 9×26 resource units (see Table 1).

TABLE 1

| RU Type | 20 MHz | 40 MHz | 80 MHz | 80 + 80 & 160 MHz |
| --- | --- | --- | --- | --- |
| 26-tone | 9 | 18 | 37 | 74 |
| 52-tone | 4 | 8 | 16 | 34 |
| 106-tone | 2 | 4 | 8 | 16 |
| 242-tone | 1 | 2 | 4 | 8 |
| 484-tone | N/A | 1 | 2 | 4 |
| 996-tone | N/A | N/A | 1 | 2 |
| 2 × 996-tone | N/A | N/A | N/A | 1 |

The OFDMA technique allows subcarriers to be allocated to different devices for simultaneous transmission to or from those devices. OFDMA transmissions in DL and UL allow different stations to occupy different RUs in a PPDU. Within that RU it could be SU-MIMO or MU-MIMO.

The network policy application module 250 to apply airtime RUs including transmitting trigger packets from the access point to the quarantined stations, the trigger packets comprising an assignment of RUs for each quarantined station of the quarantined stations. The network policy module also applies additional network policies to quarantine data packets transmitted from the quarantined stations to the access point in compliance with the airtime RU allocation. The additional network policies concern network-side policies for quarantined packets, separate from airtime policies. Policies can be automatically or manually stored and updated. In one embodiment, a policy includes a number of parameters, conditions, Boolean rules and artificial intelligence inputs. Policies can relate to quality of service, throughput limits or minimums, types of devices, particular users, type of traffic, and the like. For example, audio, video and voice can have different rules on an enterprise network, at different times and during varying network conditions.

The quarantined station 140 has been associated by the network as a security risk. For example, an intrusion detection program may detect malicious actions occurring at a particular station. In another example, the quarantined station 140 itself has not partaken in any malicious activities, but local security measures may fail to prevent malicious actors from exploiting local security vulnerabilities. The quarantined station 140 can be a smart phone, a laptop, a Chromebook, a tablet, an IoT (Internet of Things) device, a smart appliance, an alarm system, or any networked device exchanging data packets and/or control packets with the data communication network 199.

FIG. 2A is a more detailed block diagram illustrating the access point 110 of the system of FIG. 1, according to one embodiment. The access point 110 includes an airtime suppression module 211, a station access module 212 and a packet processing module 213. The airtime suppression module 211 uses RUs to prevent airtime transmissions of quarantined stations, as set forth in more detail below with respect to FIG. 2B. The station access module 211 tracks wireless stations connected to the access point 110 and associated BSSIDs. The packet processing module 213 handles data packets incoming and outgoing for the access point 110. Wi-Fi packets are transmitted and received with a wireless transceiver.

More detail about the airtime suppression module 211 is shown in FIG. 2B. The airtime suppression module 211 includes a network policy database 210, a quarantined station database 220, and a quarantining module 230, an RU airtime allocation module 240, and a network policy application module 250. The component functionalities can be implemented in hardware, microcode, high level software code, or a combination.

The network policy database 210 stores a plurality of network policies, including quarantined station network policies. Network-side policies, as opposed to airtime policies, are also stored. Data packets that comply with airtime policies, thereby permitting transmission across a Wi-Fi communication channel, are scrutinized once received by access points. Additional policies can apply at this point, to control bandwidth, for quality of service guarantees, for security, and other processes.

The quarantined station database 220 stores a list of quarantined stations. Updates to the quarantined stations are periodically stored in real-time or in batch processes. In one embodiment, a Wi-Fi controller tracks a quarantined station across the Wi-Fi communication network as it connects from one access point to another access point, all under management of the Wi-Fi controller.

The quarantining module 230 moves quarantined stations from a first VLAN to a quarantine VLAN. The VLAN has a dedicated BSSID on the Wi-Fi communication network. The quarantining module 230 also moves stations taken off quarantine back to the first VLAN.

The RU airtime allocation module 240 allocates airtime RUs to each of the quarantined stations, the airtime RUs allocated through trigger data packets transmitted from the access point to the quarantined stations. The airtime RU allocation module determines an amount of RUs for access to airtime on a Wi-Fi communications network, based on a network policy that limits an amount of airtime allowed by quarantined stations.

The network policy application module 250 to apply airtime RUs including transmitting trigger packets from the access point to the quarantined stations, the trigger packets comprising an assignment of RUs for each quarantined station of the quarantined stations. The network policy module also applies additional network policies to quarantine data packets transmitted from the quarantined stations to the access point in compliance with the airtime RU allocation. The additional network policies concern network-side policies for quarantined packets, separate from the airtime policies.

FIG. 3 is a block diagram illustrating an example of a trigger frame 300. The trigger frame 300 includes a User Info field according to IEE 802.11ax protocol. The User Info field has an 8-bit RU allocation field that indicates the size of RUs and their placement in the frequency domain. There can be up to 9 simultaneous devices, or 9×26 resource units, in one example. Stations can be identified by MAC number of network interface hardware or software. This mechanism allows network control of station access to airtime.

Stations report to an access point if they have data and the amount of buffered data they have. The access point then allocates RUs to stations which have data to transmit through trigger frames. For non-quarantined stations, policies can differ from quarantined stations which are being suppressed from sending data. In one embodiment, an amount of data buffered by quarantined stations are ignored by airtime network policies, regardless of standard trigger frame operations for non-quarantined stations.

Figure 4:
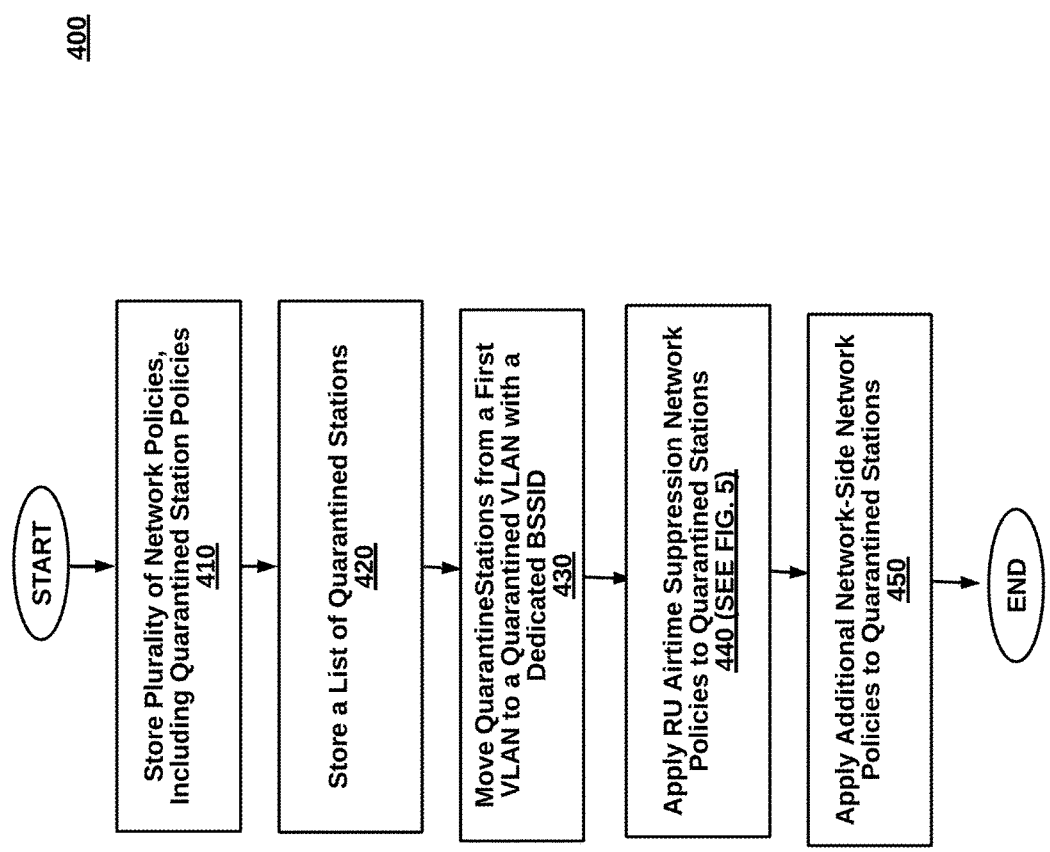
FIG. 4 is a high-level flow chart illustrating a method for RU-based medium access control for suppressing airtime of quarantined stations on Wi-Fi communication networks, prior to transmission from the quarantined stations, according to one embodiment.
Figure 5:
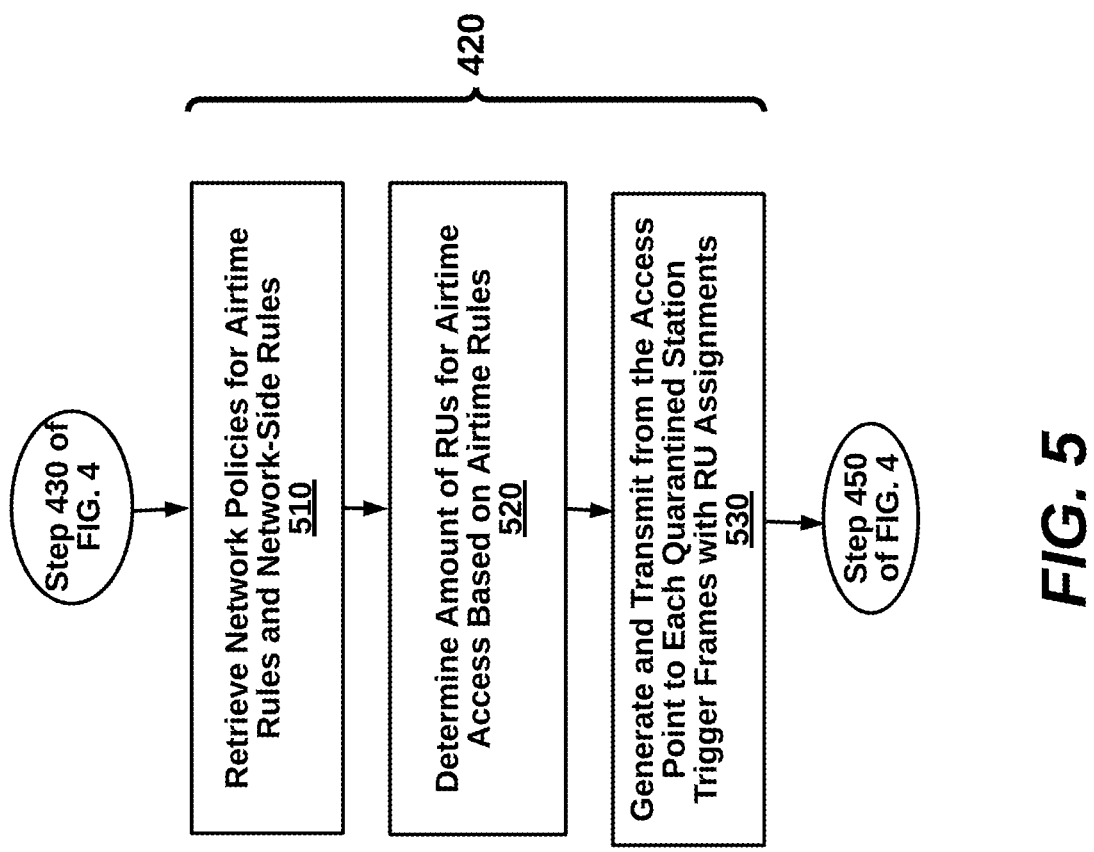
FIG. 5 is a more detailed flow chart illustrating a step of applying airtime suppression network policies of the method of FIG. 4, according to an embodiment.

Methods for RU-Based Suppression of Quarantined Station Airtime (FIG. 4-5)

FIG. 4 is a high-level flow diagram illustrating a method 400 for RU-based medium access control for suppressing airtime of quarantined stations on Wi-Fi communication networks, prior to transmission from the quarantined stations, according to one embodiment. The method 400 can be implemented by, for example, the access point 110 of FIG. 1, or other network devices. The steps of the method can be performed as shown or in different orders, with additional steps included, over various embodiments.

At step 410, a network policy database stores a plurality of network policies, including quarantined station network policies. Network-side policies, as opposed to airtime policies, are also stored. Data packets that comply with airtime policies, thereby permitting transmission across a Wi-Fi communication channel, are scrutinized once received by access points. Additional policies can apply at this point, to control bandwidth, for quality of service guarantees, for security, and other processes.

At step 420, a quarantined station database stores a list of quarantined stations. Updates to the quarantined stations are periodically stored in real-time or in batch processes. In one embodiment, a Wi-Fi controller tracks a quarantined station across the Wi-Fi communication network as it connects from one access point to another access point, all under management of the Wi-Fi controller.

At step 430, a quarantining module moves quarantined stations from a first VLAN to a quarantine VLAN. The VLAN has a dedicated BSSID on the Wi-Fi communication network. An access point can use multiple BSSIDs, one dedicated to quarantine, one dedicated to the first VLAN, and other BSSIDs used for other stations. The quarantining module also moves stations taken off quarantine back to the first VLAN, in an embodiment.

At step 440, RU airtime suppression network policies are applied by an allocation module. More detail for step 540 is shown in FIG. 4. At step 510, network policies for quarantined stations are retrieved, including airtime rules and network-side rules, in an embodiment. Records can be stored locally or at a third-party server and comprise a list of rules. One rule can be an explicit RU assignment. Another rule can derive RU assignments from characteristics of a station's threats. Still another rule can assign RUs to different categories of quarantines stations. Many other airtime rules are possible.

At step 520, the airtime allocation module determines an amount of RUs for access to airtime on a Wi-Fi communications network, based on a network policy that limits an amount of airtime allowed by quarantined stations.

At step 530, trigger frames are generated and are transmitted from the access point to each of the quarantined stations. The trigger frames include a data field for assignments of RUs to specific quarantined stations and also to non-quarantined stations (see FIG. 3).

Referring again to FIG. 4, at step 450, the network policy application module also applies additional network-side policies to quarantine data packets transmitted from the quarantined stations to the access point in compliance with the airtime RU allocation policies. The additional network policies concern network-side policies for quarantined packets, separate from the airtime policies. One example rule for network-side policies can concern bandwidth allocation. Another example rule can concern quality of service. Many other network-side rules are possible.

Figure 6:
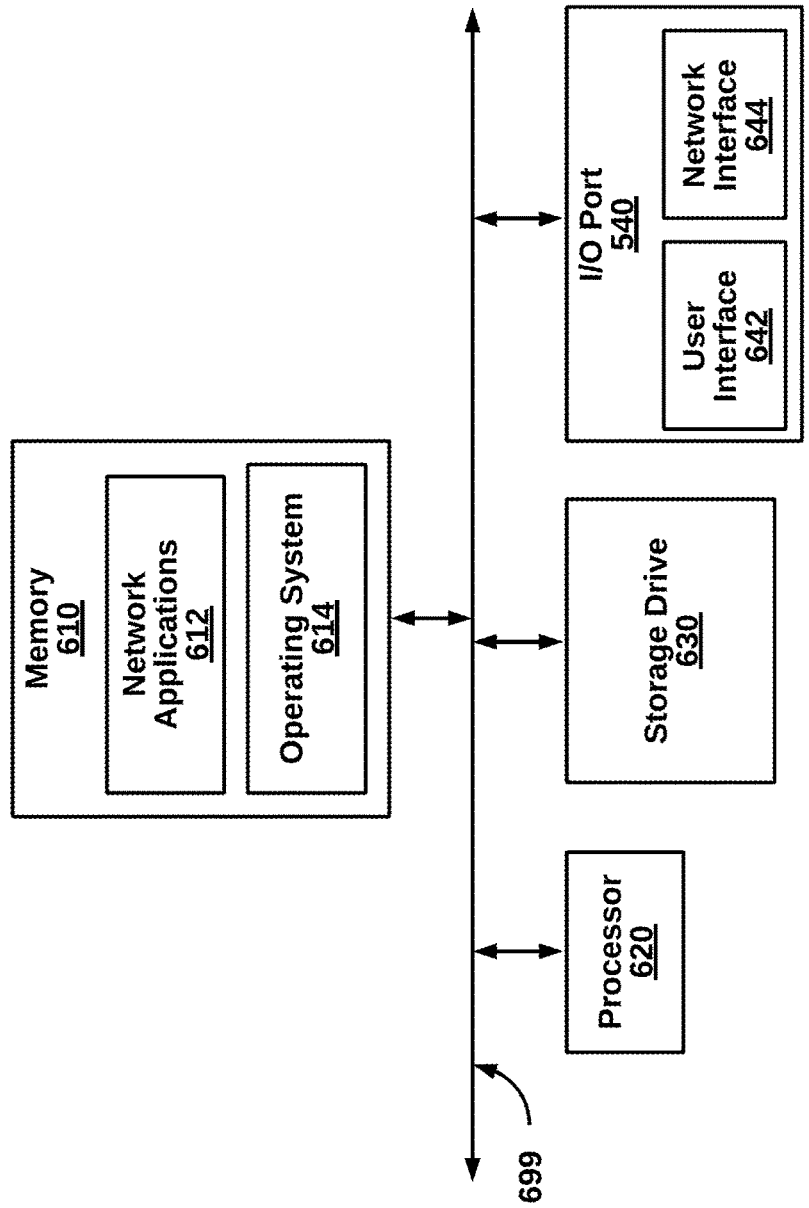
FIG. 6 is a block diagram illustrating an example computing device, according to one embodiment.

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, such as the access point 110, non-quarantined stations 120A, the quarantined stations 120B, and the Wi-Fi controller 130. Additionally, the computing device 600 is merely an example implementation itself, since the system 100 can also be fully or partially implemented with laptop computers, tablet computers, smart phones, Internet appliances, and the like.

The computing device 600, of the present embodiment, includes a memory 610, a processor 620, a hard drive 630, and an I/O port 640. Each of the components is coupled for electronic communication via a bus 699. Communication can be digital and/or analog, and use any suitable protocol.

The memory 610 further comprises network applications 612 and an operating system 614. The network applications 620 can include the modules of network applications. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C π, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. An access point in a network security system, coupled in communication with a data communication network and coupled in communication with a Wi-Fi communication network, for extended RU (resource unit)-based medium access control for suppressing airtime of quarantined stations on Wi-Fi communication networks, prior to transmission from the quarantined stations, the access point comprising:

a processor;
a network interface, communicatively coupled to the processor, coupled to the data communication network, and coupled to the Wi-Fi communication network; and
a memory device, communicatively coupled to the processor and to the network interface, the memory device storing code that when executed by the processor, comprises:
a network policy database to store a plurality of network policies, including quarantined station network policies;
a quarantined station database to store a list of quarantined stations;
a quarantining module to move quarantined stations from a first VLAN to a quarantine VLAN, having a dedicated BSSID on the Wi-Fi communication network, and to move stations taken off quarantine from the quarantine VLAN to the first VLAN;
an RU airtime allocation module to allocate airtime RUs to each of the quarantined stations, the airtime RUs allocated at the quarantined stations through trigger data packets transmitted from the access point to the quarantined stations, wherein the airtime RU allocation module determines an amount of RUs for access to airtime on a Wi-Fi communication network, based on quarantine network policies that limit an amount of airtime allowed by quarantined stations; and
a network policy application module to apply airtime RUs including transmitting trigger packets from the access point to the quarantined stations, the trigger packets comprising an assignment of RUs for each quarantined station of the quarantined stations, wherein the network policy module also applies additional network policies to quarantine data packets transmitted from the quarantined stations to the access point in compliance with the airtime RU allocation, the additional network policies concerning network-side policies for quarantined packets, separate from the airtime policies,
wherein a Wi-Fi controller manages a plurality of access points including the access point, and wherein the access point receives a transmission from the Wi-Fi controller indicating a specific quarantined station that the Wi-Fi controller has detected as being handed-off from a second access point to the access point.

2. The access point of claim 1, wherein the quarantined station policies comprise airtime quarantined station policies and network-side quarantined station policies.

3. The access point of claim 2, wherein the airtime quarantined station polices concern transmission amounts over the Wi-Fi communication network.

4. The access point of claim 1, wherein a total spectral bandwidth of the quarantined VLAN amounts to at least one of: 20 MHz, 40 MHz, 80 MHz and 160 MHz.

5. The access point of claim 4, wherein the total spectral bandwidth is further divided into RUs.

6. The access point of claim 5, wherein a specific quarantine network policy assigns zero RUs to a specific quarantined station to prohibit any airtime for transmissions from the specific quarantined station to the access point.

7. The access point of claim 1, wherein the trigger frame comprises a user info field with an RU allocation field that indicates an amount of RUs and a spectral frequency for using the RUs.

8. A computer-implemented method in an access point of a network security system, coupled in communication with a data communication network and coupled in communication with a Wi-Fi communication network, the method for extended RU (resource unit)-based medium access control for suppressing airtime of quarantined stations on Wi-Fi communication networks, prior to transmission from the quarantined stations, the method comprising:
storing a plurality of network policies, including quarantined station network policies;
storing in a quarantined station database a list of quarantined stations;
moving quarantined stations from a first VLAN to a quarantine VLAN, having a dedicated BSSID on the Wi-Fi communication network, and to move stations taken off quarantine from the quarantine VLAN to the first VLAN;
allocating by an RU airtime allocation module airtime RUs to each of the quarantined stations, the airtime RUs allocated at the quarantined stations through trigger data packets transmitted from the access point to the quarantined stations, wherein the airtime RU allocation module determines an amount of RUs for access to airtime on a Wi-Fi communication network, based on quarantine network policies that limit an amount of airtime allowed by quarantined stations; and
applying airtime RUs with a network policy application module, including transmitting trigger packets from the access point to the quarantined stations, the trigger packets comprising an assignment of RUs for each quarantined station of the quarantined stations, wherein the network policy module also applies additional network policies to quarantine data packets transmitted from the quarantined stations to the access point in compliance with the airtime RU allocation, the additional network policies concerning network-side policies for quarantined packets, separate from the airtime policies,
wherein a Wi-Fi controller manages a plurality of access points including the access point, wherein the access point receives a transmission from the Wi-Fi controller indicating a specific quarantined station that the Wi-Fi controller has detected as being handed-off from a second access point to the access point.

9. A non-transitory computer-readable media storing source code, in an access point of a network security system, coupled in communication with a data communication network and coupled in communication with a Wi-Fi communication network, when the source code is executed by a processor, the access point performs a method for extended RU (resource unit)-based medium access control for suppressing airtime of quarantined stations on Wi-Fi communication networks, prior to transmission from the quarantined stations, the method comprising:
storing a plurality of network policies, including quarantined station network policies;
storing in a quarantined station database a list of quarantined stations;
moving quarantined stations from a first VLAN to a quarantine VLAN, having a dedicated BSSID on the Wi-Fi communication network, and to move stations taken off quarantine from the quarantine VLAN to the first VLAN;
allocating by an RU airtime allocation module airtime RUs to each of the quarantined stations, the airtime RUs allocated at the quarantined stations through trigger data packets transmitted from the access point to the quarantined stations, wherein the airtime RU allocation module determines an amount of RUs for access to airtime on a Wi-Fi communication network, based on quarantine network policies that limit an amount of airtime allowed by quarantined stations; and applying airtime RUs with a network policy application module, including transmitting trigger packets from the access point to the quarantined stations, the trigger packets comprising an assignment of RUs for each quarantined station of the quarantined stations, wherein the network policy module also applies additional network policies to quarantine data packets transmitted from the quarantined stations to the access point in compliance with the airtime RU allocation, the additional network policies concerning network-side policies for quarantined packets, separate from the airtime policies, wherein a Wi-Fi controller manages a plurality of access points including the access point, wherein the access point receives a transmission from the Wi-Fi controller indicating a specific quarantined station that the Wi-Fi controller has detected as being handed-off from a second access point to the access point.

* * * * *